United States Patent [19]

Jones

[11] Patent Number: 5,112,500
[45] Date of Patent: May 12, 1992

[54] PURIFICATION OF AQUEOUS LIQUOR

[75] Inventor: Graham Jones, Ontario, Canada

[73] Assignee: Allied Colloids Limited, England

[21] Appl. No.: 546,436

[22] Filed: Jun. 29, 1990

[51] Int. Cl.$^5$ ................................................ C02F 1/56
[52] U.S. Cl. .................................... 210/728; 210/734; 210/735
[58] Field of Search ............... 210/708, 723, 727, 728, 210/732, 734, 735

[56] References Cited

U.S. PATENT DOCUMENTS

| | | | |
|---|---|---|---|
| 3,836,200 | 9/1974 | Booth | 406/49 |
| 3,860,526 | 1/1975 | Corbett | 252/181 |
| 3,977,971 | 8/1976 | Quinn et al. | 210/738 |
| 4,089,831 | 5/1978 | Chambers | 524/421 |
| 4,720,346 | 1/1988 | Flesher et al. | 210/734 |
| 4,835,206 | 5/1989 | Farrar et al. | 210/728 |

FOREIGN PATENT DOCUMENTS

| | | |
|---|---|---|
| 2229426 | 2/1973 | Fed. Rep. of Germany . |
| 2341415 | 2/1975 | Fed. Rep. of Germany . |
| 2612101 | 9/1977 | Fed. Rep. of Germany . |
| 48-084776 | 11/1973 | Japan . |
| 49-049802 | 5/1974 | Japan . |
| 50-003974 | 1/1975 | Japan . |
| 50-047888 | 4/1975 | Japan . |
| 52-025458 | 2/1977 | Japan . |
| 52-047085 | 4/1977 | Japan . |
| 52-018668 | 5/1977 | Japan . |
| 55-086505 | 6/1980 | Japan . |
| 81-010081 | 3/1981 | Japan . |
| 56-115605 | 9/1981 | Japan . |
| 57-015807 | 1/1982 | Japan . |
| 58-070807 | 4/1983 | Japan . |
| 58-702869/27 | 5/1983 | Japan . |
| 58-215454 | 12/1983 | Japan . |
| 60-087813 | 5/1985 | Japan . |
| 60-202787 | 10/1985 | Japan . |
| 62-007430 | 1/1987 | Japan . |

OTHER PUBLICATIONS

Hood et al., "Dewatering of Red Mud", *Process Technol. Proc.*, 4(Flocculation, Biotechnol. Sep. Syst.) pp. 773-791.

*Primary Examiner*—Peter Hruskoci
*Attorney, Agent, or Firm*—Ostrolenk, Faber, Gerb & Soffen

[57] ABSTRACT

Suspended solids are separated from an aqueous suspension by mixing into the suspension first and second flocculants that would normally be incompatible in solution but which are added in the form of solids which dissolve into the suspension, and the resultant flocculated material is separated from the flocculated suspension.

4 Claims, No Drawings

PURIFICATION OF AQUEOUS LIQUOR

BACKGROUND OF THE INVENTION

This invention relates to processes and compositions for separating suspended solids from aqueous suspensions containing them.

Aqueous suspensions are usually clarified by the addition of one or more water soluble organic polymers that are commonly referred to in the industry, and are described herein, by the generic term "flocculant". In fact, these "flocculants" can be of two entirely different types that operate by entirely different mechanisms. The true flocculant (herein referred to as a "bridging flocculant") is a high molecular weight polymer that achieves its flocculation effect primarily by a bridging mechanism. Bridging flocculants must have high molecular weight, generally above 5 million and frequently above 10 million. When expressed in terms of intrinsic viscosity, this is usually at least 5 dl/g and often above 10 dl/g.

Molecular weights mentioned herein are measured by gel permeation chromatography and intrinsic viscosities are measured by suspended level viscometer at 25° C. in 1 molar aqueous sodium chloride buffered to pH 7.0.

The other type of "flocculant" is the material that is more accurately referred to as a "coagulant". It is a lower molecular weight, highly ionic, material that achieves its flocculation effect (i.e., coagulation) primarily by adsorbing on to the solid particles in the suspension and changing the surface charge on them, with little or no bridging effect between solid particles. These coagulants must have high ionic charge and typically at least 50% of the monomers, frequently at least 80%, by weight of the monomers from which they are formed carry ionic charge. They must have low molecular weight and typically this is below about 1.5 million and, when they are anionic, the molecular weight is often very much less, typically below 500,000. Expressed in terms of intrinsic viscosity, the coagulants generally have IV below 3 dl/g, often below 2 dl/g.

There are many instances where it is desirable to flocculate a suspension of suspended solids by addition of two flocculants that are incompatible with each other in solution, in the sense that they tend to interact physically or chemically with each other rather than with the suspended particles. For instance when equal volumes of 0.5% aqueous solutions of the two polymers are combined they may give a precipitate or a gel.

A common example of this incompatibility arises with highly counterionic flocculants. The most effective anionic flocculants are generally present as alkali metal salts, and the most effective cationic flocculants are generally present as quaternary ammonium or acid addition salts of tertiary amine polymers. Although, for instance, the corresponding free acid polymer may be compatible with, for instance, the free base or acid addition salt polymer, the alkali metal salt version of the anionic polymer tends to be highly incompatible with the acid addition or quaternary ammonium salt polymers. This is unfortunate, as these combinations tend to be the most effective flocculants.

Accordingly it is necessary, at present, to keep them apart and if both types are to be used they are both generally dosed sequentially into the suspension as preformed aqueous solutions. In a typical process, a coagulant is added to cause coagulation-flocculation and a bridging flocculant is added subsequently to bridge-flocculate the coagulated material.

Because the coagulant polymers are of low molecular weight and high ionic content, they have low solution viscosities and so normally are provided as aqueous concentrates. These can be dosed direct into the suspension or they can be diluted in-line prior to dosing. The supply of aqueous concentrates involves the transport and packaging of large amounts of water and it might have been thought to have been desirable to supply the coagulant polymers in solid form instead. Methods of making water soluble polymers in, for instance, bead form are well known. However, coagulant polymers have to be in solution before they can act as coagulants and so normal considerations would dictate that the user should provide make-up apparatus for dissolving the solid coagulant polymer into water prior to dosing the resultant solution into the suspension. Accordingly, there has been little incentive for the user to add this make-up apparatus in preference to buying the normal aqueous concentrate and dosing it direct, or diluting it in-line.

Accordingly, the great majority of coagulant polymers are still provided as aqueous concentrates. For instance, a widely used coagulant polymer is polydiallyldimethyl ammonium chloride. Many manufacturers supply this as aqueous concentrate but there is only one solid grade of it, supplied by Allied Colloids Inc. and Allied Colloids Ltd. under the trade names Magnafloc 368 and Percol 368.

Bridging flocculants have much molecular weight and so cannot conveniently be supplied as aqueous concentrates and, instead, have to be supplied as dispersions in oil or as powders. It is well known that many of them dissolve rather slowly and so in practice all conventional systems for adding bridging flocculants to a suspension involve make-up apparatus for mixing the powder or dispersion with water and for holding it for a prolonged period, generally at least an hour, to allow dissolution to go to substantial completion.

Although normal practice therefore requires that coagulant polymers should be added as aqueous concentrates or diluted aqueous concentrates and that bridging flocculants should be made up into an aqueous solution over a period of at least an hour before dosage, there have been some instances where solid bridging flocculants have been added direct to a suspension. For instance it is known to add blocks or particles of flocculant to a flowing suspension where relatively crude separation is sufficient, and in some of these systems inorganic coagulant is included as well.

Because of the problems of incompatibility between similar amounts of highly counterionic polymers, all normal processes for using similar amounts of counterionic polymers therefore always involve sequential dosing of preformed solutions. For instance JP 63218246 describes various polymer blends and shows that an insoluble product is obtained when there is dissolved into water a blend of powdered acrylamide-sodium acrylate copolymer and powdered acrylamide-quaternised dimethylaminoethyl methacrylate copolymer.

In JP-A-58215454 powder blends are formed of an acrylamide acrylic acid copolymer and a diethylaminoethyl methacrylate polymer. However the cationic polymer is in the form of the free base, the anionic polymer is in the form of the free acid, and the blend includes another acid, amido sulphonic acid, presumably to ensure that the anionic polymer is in free acid form so as to maintain compatibility.

In JP-A-60202787 there is a description of demulsifying an aqueous oil emulsion using various polymers and polymer blends, but the processes are described as requiring air agitation for an hour or more and clearly these are not relevant to the separation of suspended solids since coagulation occurs very rapidly.

OBJECTS OF THE INVENTION

It would be desirable to be able to achieve the advantages of the use of incompatible, counterionic, organic flocculants without having to dose them sequentially as aqueous solutions. It would also be desirable to obtain improved performance.

SUMMARY OF THE INVENTION

According to the invention, suspended solids are separated from an aqueous suspension by a process comprising providing a first particulate, water soluble, ionic, polymeric flocculant in the form of solid particles that have a size of at least 90% by weight above 30 $\mu$m, providing a second particulate, water soluble, ionic, polymeric flocculant that is counterionic to the first flocculant and that is incompatible in solution with the first polymeric flocculant and that is in the form of solid particles that have a size of at least 90% by weight above 30 $\mu$m, mixing the first and second solid, particulate, polymeric flocculants into the suspension and thereby dissolving the solid flocculants and flocculating suspension, and separating the resultant flocculated material from the suspension.

DETAILED DESCRIPTION OF PREFERRED EMBODIMENTS

The first and second solid flocculants can be added sequentially to the suspension but preferably they are added substantially simultaneously. The preferred way of performing the invention comprises adding both flocculants at the same place since it is then possible to add both flocculants using a single dosing system. Preferably the flocculants are provided as a previously blended mixture of the solid particles.

The invention includes also dry blends of the two particulate flocculants, especially the dry blends where one of the flocculants is a low molecular weight coagulant and the other is a higher molecular weight bridging flocculant.

One advantage of the invention is that it provides for very simple dosing of the desired, incompatible, flocculants into the suspension and yet gives very effective results and, in particular, avoids the incompatibility problems that would be expected.

Another advantage of the invention is that it gives better performance than is obtained by either flocculant alone, and often better than would be expected using preformed solutions of the two flocculants.

I am unclear as to why it is possible, by the invention, to avoid incompatibility and to obtain such good performance results, but it may be associated with the polymers being released gradually into the suspension. Thus as each polymer type gradually dissolves, the polymer molecules from the respective solid flocculants will be adsorbed on to the surfaces of the suspended solids. This adsorption will occur substantially immediately upon dissolution, especially in respect of the lower molecular weight flocculants. Accordingly the amount of each of the flocculants in solution at any particular time will always be relatively low, thereby minimising incompatibility problems. This is in contrast to conventional processes where all the polymer molecules are made available instantaneously as a solution, and so the two types of molecules are liable to interact.

Additionally, if agitation or other effects cause a deficiency of one of the polymers on part of the surface of the suspension particles, this deficiency can be made up almost immediately by fresh polymer molecules that are still dissolving from the particles of that flocculant.

Although the invention is of value in any situation where it is desired to treat a suspension with incompatible, counterionic, flocculants, the invention is of particular value when one of the flocculants is a coagulating flocculant and the other is a bridging flocculant.

Coagulant flocculants can be anionic but are generally cationic. They generally have intrinsic viscosity between 0.2 and 3 dl/g.

When the coagulant polymer is cationic, intrinsic viscosity is generally at least about 0.2, preferably in the range of about 0.5 to 3, most preferably around 0.8 to 2.4 dl/g. Expressed in terms of molecular weight, it is generally preferred for the molecular weight t be below 2 million, most preferably below 1.5 and, preferably, below 1 million, although it should generally be above 100,000 and preferably above 500,000.

When the coagulant polymer is anionic, lower molecular weights are usually desirable, and in particular the anionic polymer should have a molecular weight below 1,000,000, most usually below 500,000. It must not be too low as otherwise it will act as a dispersant rather than a coagulant and so normally the molecular weight is above 50,000, often above 100,000.

The coagulant-flocculant can be a low molecular weight, rapidly dissolving, highly ionic, naturally occurring polymer but generally it is a synthetic polymer formed by polymerisation of a water soluble ethylenically unsaturated monomer or blend of monomers and has a high charge density. Accordingly it is preferred for at least 50%, and generally at least 80%, of the monomers from which it is formed to have an ionic charge. Although the polymer can be amphoteric, preferably all the ionic monomers have the same charge. Although polymers in which 100% of the monomers are ionic are preferred, if non-ionic monomer is present its amount is generally below 50%, and preferably below 20% by weight. Any of the non-ionic, ethylenically unsaturated, water soluble monomers that are conventionally present in polymeric ionic coagulants can be used, but acrylamide is preferred. It is generally best for the polymer to be a homopolymer of ionic monomer.

Preferred anionic monomers are ethylenically unsaturated carboxylic or sulphonic acids, generally as their water soluble alkali metal salts. Examples are 2-acrylamido-2-methyl propane sulphonic acid, methacrylic acid and, especially, acrylic acid (as sodium or other alkali salt). Thus a suitable anionic polymer is a homopolymer of sodium acrylate.

Preferred cationic monomers are dialkylaminoalkyl (meth) -acrylates and -acrylamides, as acid addition or, preferably, quaternary ammonium salts, and diallyl dialkyl ammonium halides. The preferred acrylates and methacrylates are preferably di-$C_{1-4}$ alkylaminoethyl (meth) acrylates and the preferred acrylamides are di- C$_{1-4}$ alkylaminopropyl (meth) acrylamides, in particular dimethylaminoethyl (meth) acrylate and dimethylaminopropyl (meth) acrylamide (with the respective methacrylate and methacrylamide compounds being particularly preferred) as acid addition and, preferably, quaternary ammonium salts. For most purposes the most suitable cationic monomer is diallyl dimethyl ammonium chloride. Generally a single cationic monomer is used, but if desired a copolymer may be formed, for instance from diallyl dimethyl ammonium chloride and dimethylaminopropyl methacrylamide salt, generally with the latter in a minor proportion.

Instead of forming the polymer by addition polymerisation of ethylenically unsaturated monomers, any other known ionic coagulant polymers can be used. For instance suitable polymers are polyethylene imine and polyamines, e.g., as made by condensation of epichlorhydrin with an amine. Other polymers include aminomethylolated polyacrylamide (free base or quaternary or acid salt), poly (2-hydroxypropyl-1-N-methylammonium chloride), poly (2-hydroxy-propyl-1, 1-N-dimethylammonium chloride, and poly (2-vinylimidazolinum bisulphate.

Particularly preferred polymers for use in the invention are polymers of diallyl dimethyl ammonium chloride, generally as homopolymers but optionally with up to 20% of other monomer, generally acrylamide, having IV of about 0.6 to 3, most preferably around 0.8 to 2.5 dl/g. Preferably the polymer is in the form of beads.

The bridging flocculant is counterionic to the coagulant. When it is cationic, intrinsic viscosity is generally at least 5, preferably at least 7 dl/g and is typically up to 12 dl/g. When, as is usually preferred, the bridging flocculant is anionic, intrinsic viscosity is usually much higher, for instance above 8 dl/g, often above 10 dl/g and up to, for instance, 30 dl/g. The molecular weight typically is above 5 million and often above 10 million.

The bridging flocculant can be an alkali metal salt of an anionic naturally occurring polymer or of a modified naturally occurring polymer, but is preferably a synthetic polymer formed from a water soluble ethylenically unsaturated monomer or monomer blend. Generally at least 10%, and often at least 50% and frequently at least 80% of the monomers are ionic with any other monomers being non-ionic.

Any of the non-ionic, anionic and cationic monomers discussed above, in connection with the coagulants, can be used as monomers from which the bridging flocculants can be made.

Particularly preferred bridging flocculants are anionic polymers of alkali metal salts of acrylic acid or 2-acrylamido 2-methyl propane sulphonic acid, optionally with acrylamide in an amount of generally not more than about 70% and preferably having intrinsic viscosity of at least about 10 dl/g. Particularly preferred polymers are copolymers of sodium acrylate and acrylamide (typically in amounts of 20 to 70% by weight) having intrinsic viscosity in the range 10 to 20 dl/g.

The polymers may be made by conventional techniques. For instance high molecular weight, bridging flocculant polymers can be made by bulk gel polymerisation followed by comminution and drying or by reverse phase bead polymerisation followed by drying, and optionally comminution.

As regards the coagulant polymer, the particles of polymer are preferably substantially bead shaped, for instance as made by reverse phase suspension polymerisation. Reverse phase suspension polymerisation typically comprises dispersing beads of aqueous monomer in a water immiscible liquid, generally in the presence of amphiphilic polymeric stabiliser, polymerisation within the beads, drying by azeotropic distillation and then separation of the beads from the liquid, often followed by further drying. Suitable methods and materials are well known and are described in, for instance, U.S. Pat. Nos. 2,982,749, 4,506,062 and 4,528,321.

Other solid particulate forms can be used. For instance a solution of the polymer can be drum dried or otherwise dried as a film which can then be converted into flakes. If the polymer itself has characteristics such that it is difficult to provide it in the form of solid particles that can be handled without, for instance, caking, then the particles can be formed of a mixture of a carrier (that promotes formation of particles) and the polymer. For instance the polymer can be distributed throughout beads of a matrix material that will liberate the polymer rapidly upon contact with water, for instance as a result of disintegration of the matrix in water. A suitable matrix material is a carbohydrate, for instance starch, or an inorganic carrier material. The blend can be made as in, for instance, EP-A-188489. Preferably however the polymer particles consist solely of the desired polymer.

Suitable coagulant solid polymers are available from Allied Colloids Limited under the trade names Magnafloc 368 (polydiallydimethyl ammonium chloride) and Versicol S11 (polysodium acrylate molecular weight about 250,000).

The mixing of the particulate polymeric flocculants into the suspension is normally accompanied by some turbulence or agitation of the suspension to promote dissolution of the particles. The turbulence that inevitably arises during flow of a stream that is being coagulated in conventional manner can be sufficient and excessive shear (e.g. as provided in a homogeniser) is undesirable. Accordingly the preferred mixing consists essentially of the flow along duct means leading to the separation stage, although some initial mixing may be applied to promote uniform distribution of the polymer particles as they are scattered, flowed or injected into the flowing suspension.

The process may be carried out batchwise, but generally the particles are added to a flowing stream of the suspension and the suspension is caused to flow turbulently along duct means from the position at which the particles are added to the position at which the separation process is initiated. For instance this flow can be along a simple duct (optionally a ditch or a launder provided with baffles to create extra turbulence) or it can be along a series of ducts, for instance including some substantially downwardly extending ducts so as to promote extra turbulence.

The invention is of particular value when the aqueous suspension is flowing through an open ditch, for instance at a mine.

The dosing of the solid flocculants into the suspension can be effected in conventional manner and will normally be adjusted so as to give a substantially constant dosage of the flocculants per unit volume of the suspension. One way of achieving this automatically, especially at mines and other sites where power supplies may be unavailable or limited, is to power the dosing system by the flowing suspension. For instance a scroll feeder can be powered by a water wheel that is driven by the flowing suspension, and thus the rate of addition of flocculant will be approximately proportional to the rate of flow of the suspension.

The separation of the flocculated solids is generally by sedimentation, but can also be by, for instance, filtration, generally after sedimentation.

The proportions of coagulant flocculant:bridging flocculant can be selected through a wide range, typically 10:1 to 1:10 by weight. When, as is preferred, the flocculants consist of a coagulant flocculant and a bridging flocculant, the amount of coagulant is generally at least as much, and preferably more than, the amount of bridging flocculant and so preferred proportions are then 10:1 to 1:1, often 6:1 to 2:1 (by weight).

It is particularly desirable in the invention that one of the polymers should dissolve faster than the other, since this will further reduce the risk of incompatibility problems. Preferably therefore one of the flocculants is a coagulant flocculant that achieves substantially full dissolution within 5 minutes, and preferably within 1 minute, and the other is a bridging flocculant that requires considerably longer to achieve substantially full dissolution, for instance at least 10 minutes, often at least 20 minutes and frequently at least half an hour. The overall process should be such that the suspension can be mixed with the flocculants, before the separation of the flocculated solids, for sufficient time for substantially complete dissolution of both flocculants to occur.

Whether or not a polymer particle has dissolved can be determined by filtration in that a screen that retains a dry or gelled polymer particle will not retain a solution of the polymer particle. A convenient way of testing the solubility therefore is to select a screen that retains a known proportion, for instance substantially all, of the polymer particles when dry and then to filter the aqueous suspension into which the polymer particles have been mixed and observe the proportion of polymer particles retained on the screen. The retained proportion at the end of the mixing period (i.e., when they should be substantially fully dissolved) must be very much less than the retained proportion of dry polymer particles, for instance having a dry weight below a quarter and preferably below one tenth of the weight of the retained dry particles.

Generally the polymer particles are substantially individual particles but if they are aggregates that break down into smaller particles before dissolution (for instance as in EP 326382) then the size of screen that should be used for testing whether or not dissolution has occurred should be the size that retains the individual component particles within each aggregate.

Although the polymer particles (or the component particles within aggregates that disintegrate into particles in the suspension) can have a size as small as 30 μm it is generally preferred for the average size to be at least 100 μm and generally at least 200 μm. If the polymer particles have an average size that is too large then this can be undesirable, for instance because it can reduce the time taken to achieve dissolution. Thus although it can be above 1 mm, preferably it is below 1 mm and usually below 800 μm.

The suspensions that can be treated in the invention can be inorganic or organic. They can be tailings from a coal washery or iron ore concentrator, china clay effluents and other suspensions, red mud washery liquors contaminated with colloidal humate (since the process of the invention can give good decolourisation), cellulosic suspensions, sewage and sewage sludges, textile industry effluents, and the treatment of potable water.

The optimum dosage of the polymers can be selected by routine experiments and the amount of each polymer is normally within or slightly below conventional amounts. For instance each polymer is generally present in an amount of 0.1 to 20mg/l of suspension, with the coagulant polymer generally being present in an amount of from 0.5 to 5mg/l suspension.

The following are some examples.

EXAMPLE 1

A coagulant homopolymer is formed from diallydimethyl ammonium chloride by reverse phase bead polymerisation by the general technique shown in U.S. Pat. No. 4,506,062. The beads have a particle size of 90% by weight between 200 and 800 μm and they have intrinsic viscosity of 1.4 dl/g. Suitable beads are available from Allied Colloids Limited under the trade name Magnafloc 368.

Bridging flocculant is formed from 40% acrylamide and 60% sodium acrylate by gel polymerisation followed by comminution and drying in conventional manner, or by reverse phase bead polymerisation and drying in conventional manner, and has IV about 16 dl/g. Suitable product is available from Allied Colloids Limited under the trade name Magnafloc 156.

When 0.5% solutions of these two polymers are prepared and are then mixed in equal volumes, a white precipitate is formed, demonstrating that they are incompatible. Incompatibility also exists when, for instance, an aqueous solution of the same anionic polymer is blended with an aqueous solution of a copolymer of acrylamide and 5% quaternised dimethylaminoethyl acrylate (IV about 12) in that a clear gel is formed.

When 1.5mg/l of the solid poly DADMAC was stirred into a 2% china clay dispersion for 15 seconds and the suspension was then left to stand, was restirred for 15 seconds and the settlement rate measured, a rate of 1.67cm/minute was observed.

When 1.5 mg/l of a mixture of 2 parts of the solid poly DADMAC with 1 part of the solid anionic polymer was added the settlement rate increased to 1.85. Similarly, at dosages of 3 mg/l the settlement rate was 4.6 cm/minute for the poly DADMAC alone and 6.36 cm/minute for the blend of 2 parts poly DADMAC with 1 part anionic, and at 5 mg/l the settlement rates were 4.37 cm/minute for the poly DADMAC and 12.1 cm/minute for the blend.

EXAMPLE 2

The solid poly DADMAC and solid anionic polymers used in this example were the same as in example 1. An aqueous mine effluent flowing through an open ditch was dosed with powdered polymer from a hopper using a scroll feed that led into the ditch and that was powered by a water wheel and driven by the flowing stream.

When 9.8 mg/l of the poly DADMAC was added, the flocculation and clarity were each observed as being fair. When the same amount of a blend of either 2 parts or 5 parts of the poly DADMAC with 1 part of the anionic polymer was added, the flocculation was observed as being good and the clarity as excellent.

I claim:

1. A process in which suspended solids are separated from an aqueous suspension and comprising providing a cationic polymeric organic coagulating flocculant that contains quaternary ammonium groups and that has intrinsic viscosity up to 3 dl/g and that is in the form of dry solid particles that are individual particles or aggregates of particles that have a size of at least 90% by weight 30 μm to 1 mm and selecting a desired dosage of the dry solid particles within the range of 0.1-20 mg/l suspension, providing an anionic polymeric organic bridging flocculant that contains carboxylic or sulphonic acid groups in the form of an alkali metal salt and that has intrinsic viscosity above 5 dl/g and that is counterionic to the cationic flocculant and that is incompatible in solution with the cationic flocculant and that is in the form of dry solid particles that are individual particles or aggregates of particles that have a size of at least 90% by weight 30 μm to 1 mm and selecting a desired dosage of the dry solid particles within the range of 0.1-20 mg/l suspension, adding the selected dosages of the anionic and cationic particulate flocculants substantially simultaneously to the suspension as a premixed blend, and mixing the particles into the suspension and thereby dissolving the solid flocculants and flocculating the suspension, and separating the resultant flocculated material from the suspension.

2. A process according to claim 1 in which the first solid flocculant is a polymer of diallyldimethyl ammonium chloride and has intrinsic viscosity below 3 dl/g and the second solid flocculant is a polymer of sodium (meth) acrylate and has intrinsic viscosity above 5 dl/g.

3. A process according to claim 1 in which the suspension is a flowing stream of mine washery effluent.

4. A process according to claim 1 in which the separation step is by sedimentation.

* * * * *